United States Patent [19]

Miller

[11] Patent Number: 4,691,958

[45] Date of Patent: Sep. 8, 1987

[54] DOOR STOP AND LATCH

[75] Inventor: Mahlon A. Miller, Nappanee, Ind.

[73] Assignee: Newmar Corporation, Nappanee, Ind.

[21] Appl. No.: 930,733

[22] Filed: Feb. 2, 1987

[51] Int. Cl.[4] .......................... B60R 3/00; E05C 17/04

[52] U.S. Cl. ...................................... 296/146; 292/262

[58] Field of Search ................ 296/146, 152; 292/262, 292/271, 272, DIG. 17

[56] References Cited

U.S. PATENT DOCUMENTS 3,051,983 9/1962 Dale .................................... 292/262

3,608,957 9/1971 Maneck .............................. 296/146

3,853,342 12/1974 Merrick .............................. 292/262

4,593,946 6/1986 Rich .................................... 292/262

*Primary Examiner*—Robert R. Song

*Attorney, Agent, or Firm*—Thomas J. Dodd

[57] ABSTRACT

A combination stop and latch for a door. The latch is swingably carried within the door or structure side wall with the stop secured to the other of the door or side wall. The latch automatically swings into an extended position projecting from the door or side wall as the door is opened for engagement with the stop.

9 Claims, 9 Drawing Figures

DOOR STOP AND LATCH

SUMMARY OF THE INVENTION

This invention relates to a door stop and latch and will have special but not limited application to a latch for a swing-out door of a recreational vehicle.

Previously, swing-out doors in recreational vehicles included a cup-like stop fixed to the outside of the door. As the door is swung open, the cup engages a rod which extends from the vehicle side wall to latch the door in the open position. This construction requires the rod to be of no more than a certain length due to state laws concerning maximum width of the vehicle. The construction is also susceptible to breakage of the rod and is aesthetically unappealing.

This invention provides for a swing-out latch pin within the door frame or vehicle side wall and a cup-like stop secured to the other of the vehicle side wall or door frame. As the door is pivoted into the open position, the rod swings out and engages the cup stop to latch the door. When the door is closed, the rod pivots back inside the door frame or vehicle side wall.

Accordingly, it is an object of this invention to provide a novel and improved latch for a swing-out door.

Another object of this invention is to provide for a swing-out door latch which is aesthetically pleasing.

Another object of this invention is to provide for a vehicle door latch which is adaptable to all sizes of doors and vehicles without increasing the effective width of the vehicle for state code purposes.

Other objects of this invention will become apparent upon a reading of the following description.

BRIEF DESCRIPTION OF THE DRAWINGS

A preferred embodiment of the invention has been depicted for illustrative purposes wherein.

DESCRIPTION OF THE PREFERRED EMBODIMENTS

The preferred embodiments herein described are not intended to be exhaustive or to limit the invention to the precise forms disclosed. They are chosen and described to explain the principles of the invention and its application and practical use to thereby enable others skilled in the art to utilize the invention.

Figure 5:
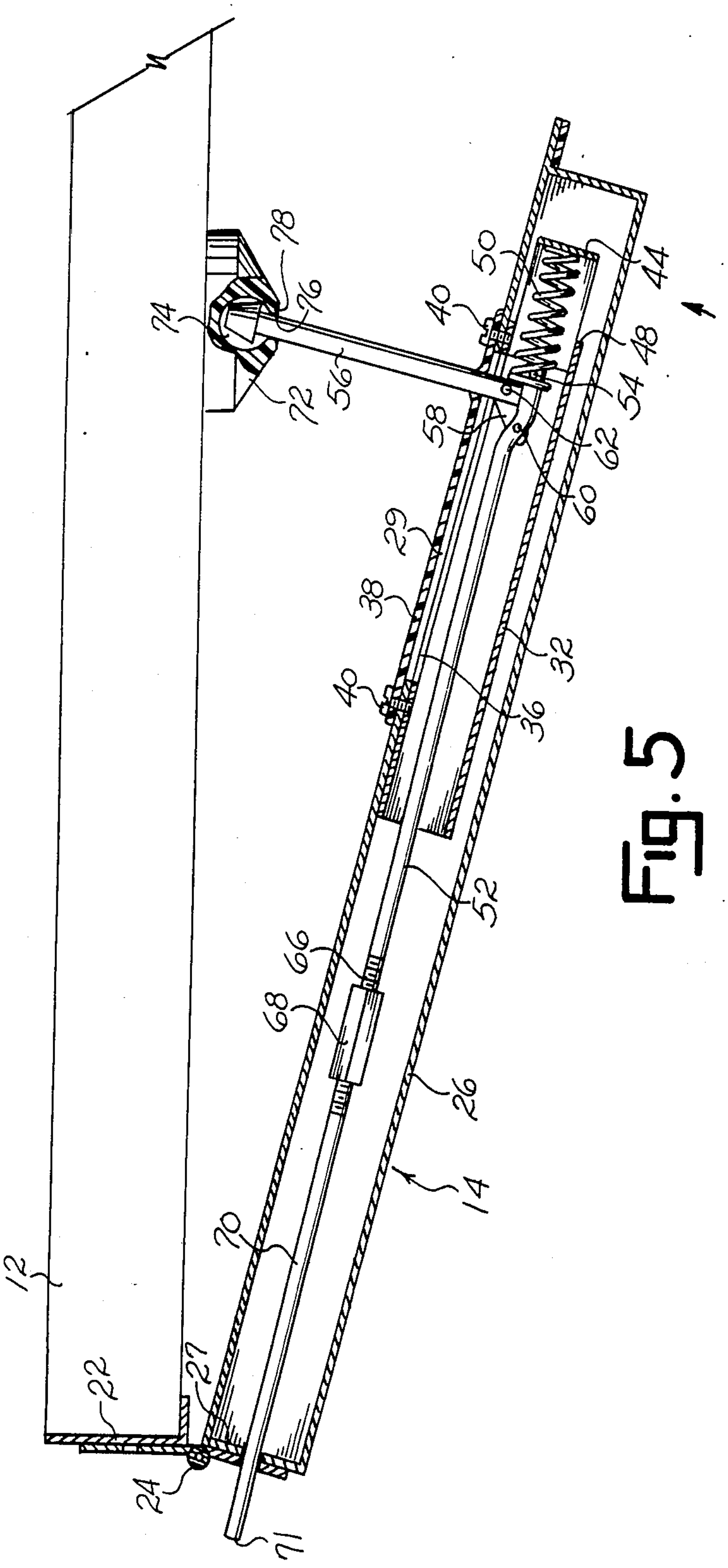
FIG. 5 is a cross-sectional view of the latch in the latched, extended position.
Figure 6:
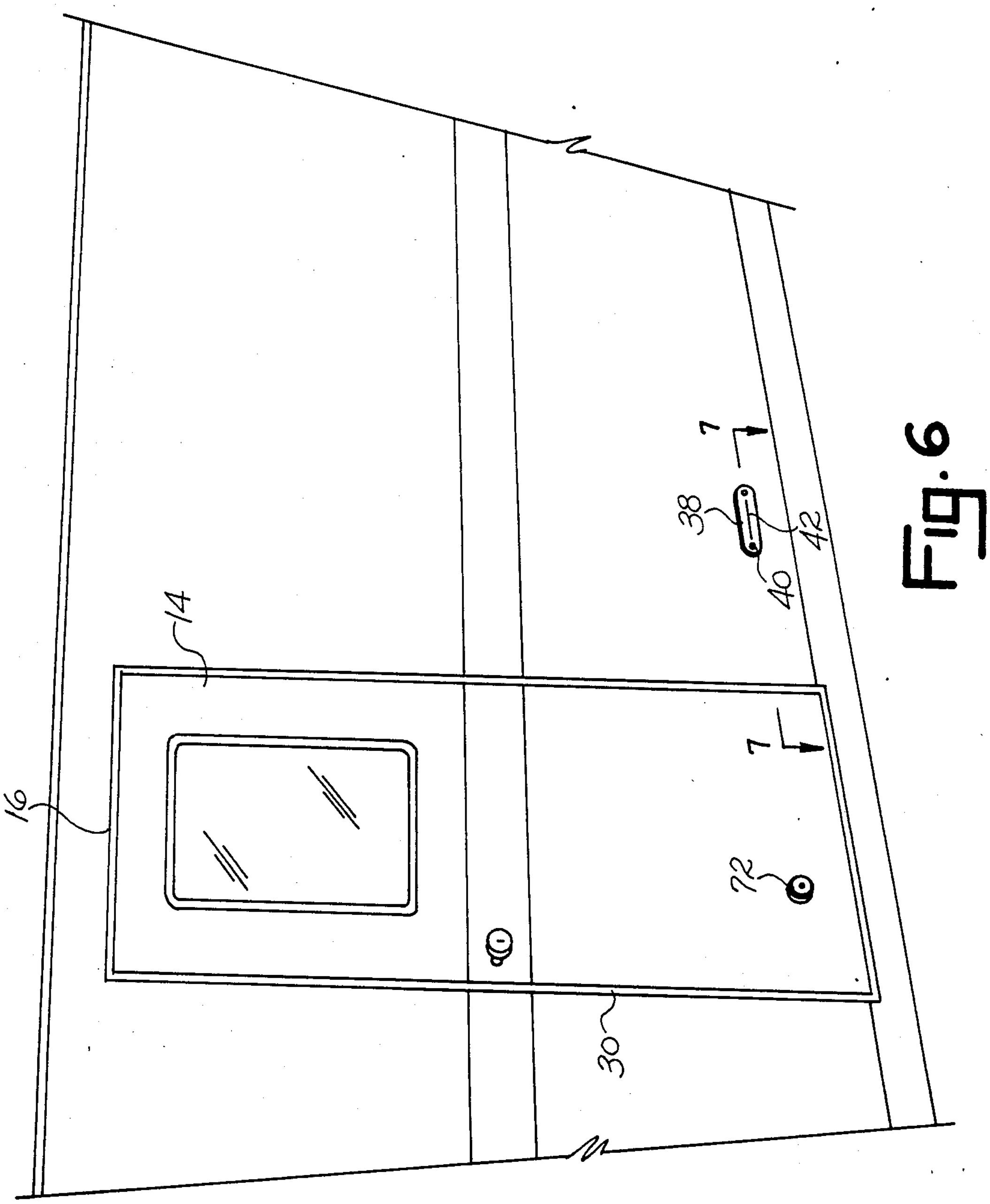
FIG. 6 is a fragmentary perspective view of a trailer side wall showing the door closed and an alternative form of the latch shown mounted to a side wall in the unlatched, retracted position.
Figures 7, 8:
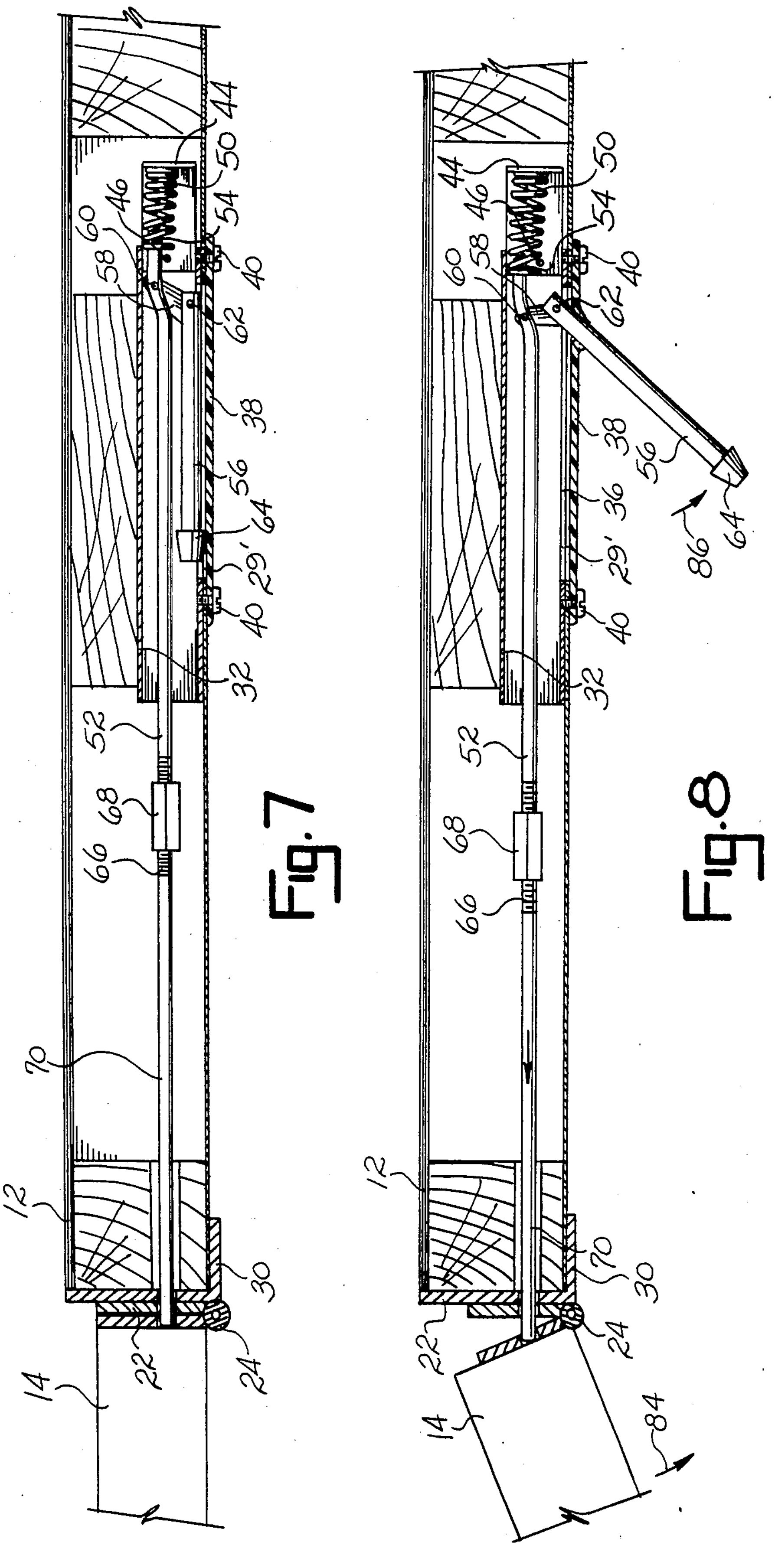
FIG. 7 is a fragmentary cross-sectional view of the latch of FIG. 6 in an unlatched, retracted position taken along line 7—7 of FIG. 6.
FIG. 8 is a fragmentary cross-sectional view of the latch of FIG. 6 in an intermediate position.
Figure 9:
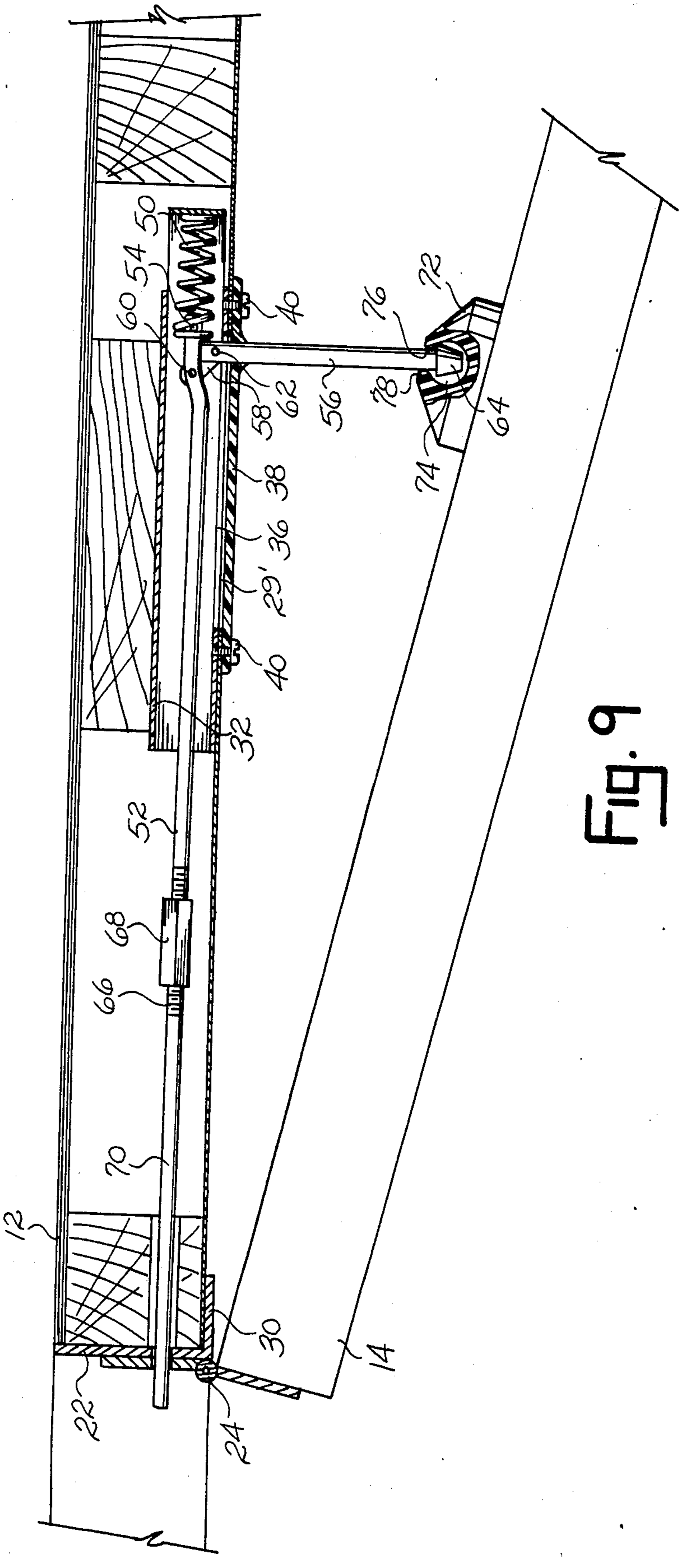
FIG. 9 is a fragmentary cross-sectional view of the latch of FIG. 6 in a latched, extended position.

The latch mechanism 10 shown in the drawings is particularly adapted for use in conjunction with a recreational vehicle such as a motor home or travel trailer which has a side wall 12 and an access door 14. Door 14 spans a door framed opening formed by header 16, threshold 18 and jambs 20 and 22, and is connected to jamb 22 by a hinge 24 which allows the door to be pivoted between open (FIGS. 5 and 9) and closed (FIGS. 1, 3, 6 and 7) positions. Door 14 includes a peripheral frame 25 and overlying sheeting or skin 26 to define a hollow interior 28. A slot 29 is formed in skin 26 which provides access to the interior. Jambs 20, 22 terminate in a trim part 30.

Figure 1:
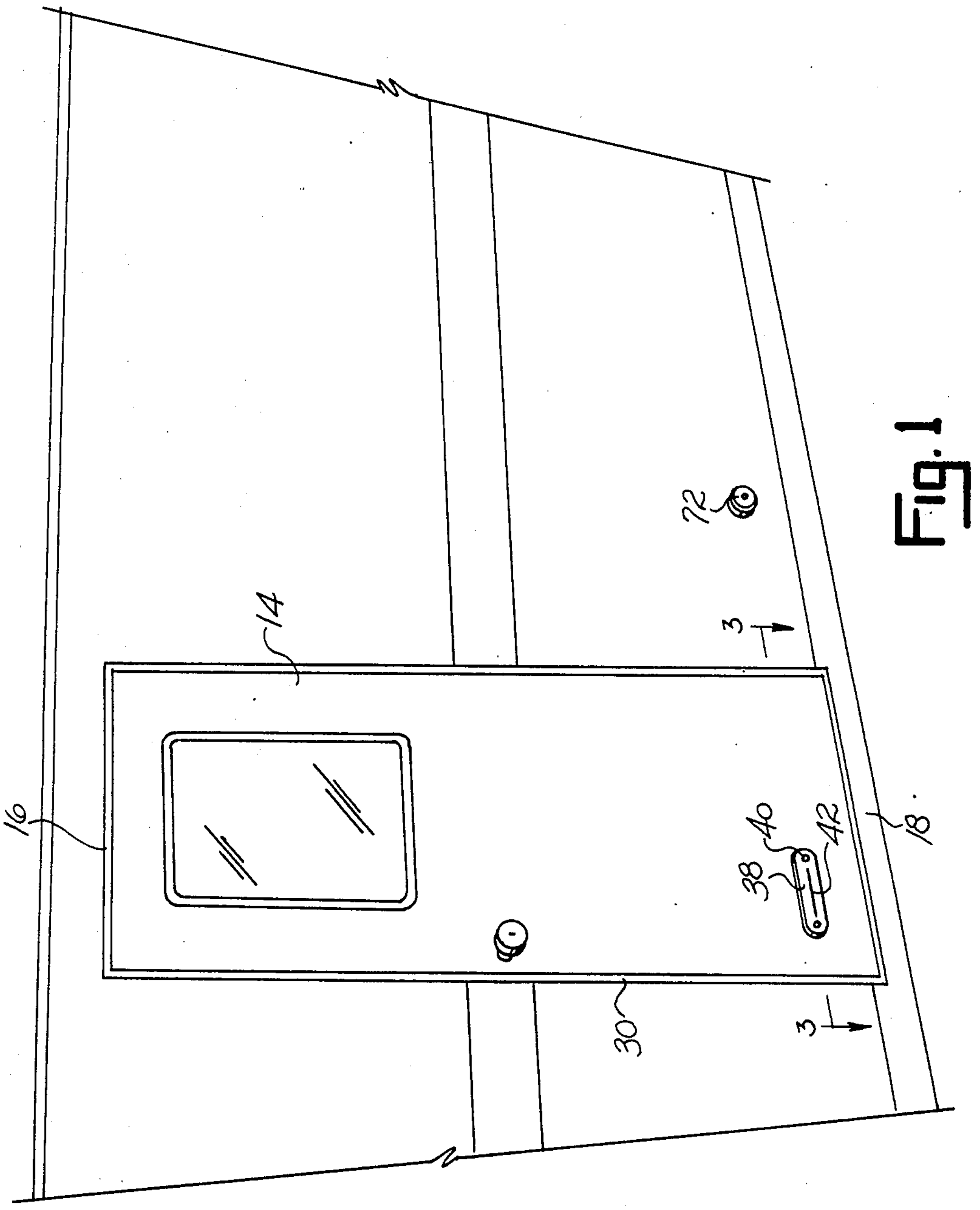
FIG. 1 is a fragmentary perspective view of a trailer side wall showing the door closed and the latch in the unlatched, retracted position.
Figure 2:
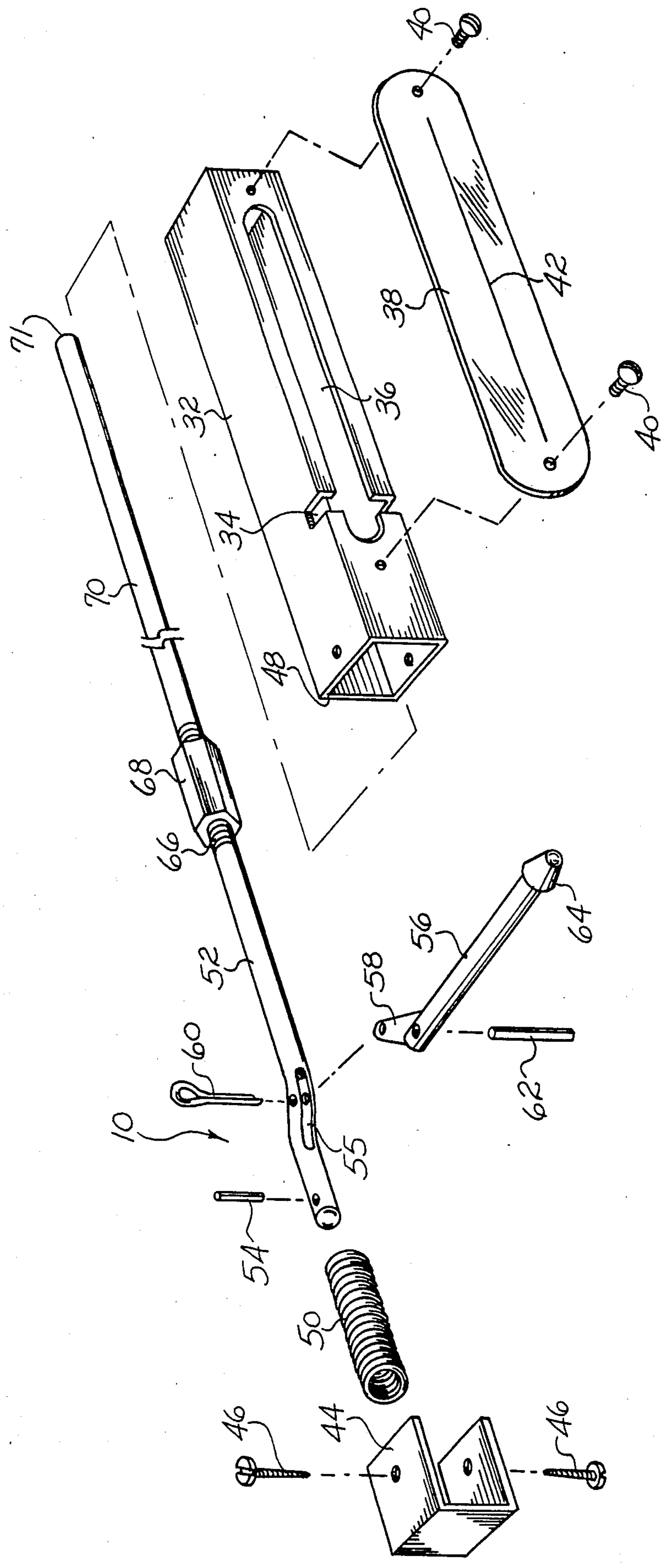
FIG. 2 is an exploded view of the latch components.
Figure 3:
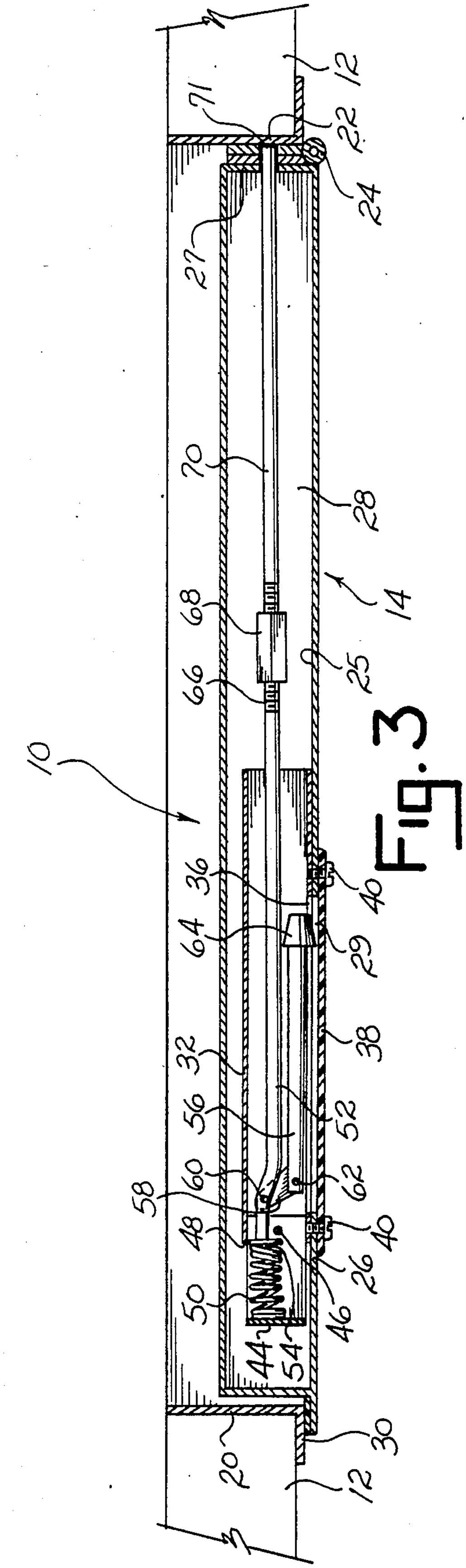
FIG. 3 is a cross-sectional view of the latch in the unlatched, retracted position taken aong line 3—3 of FIG. 1.
Figure 4:
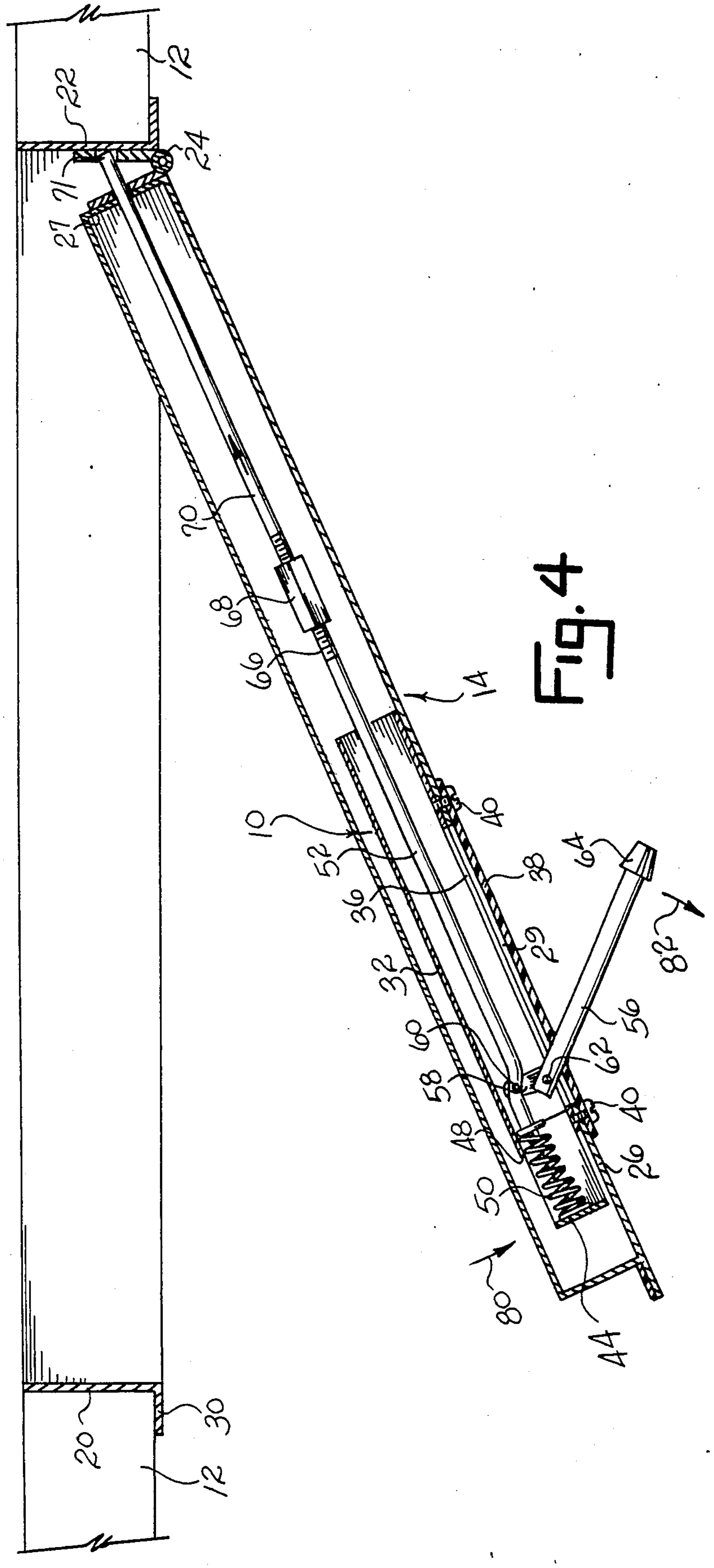
FIG. 4 is a cross-sectional view of the latch in an intermediate position.

Latch mechanism 10, shown in detail in FIG. 2, includes a housing 32 of the rectangular box configuration shown. Housing 32 includes a vertical slot 34 interrupted by a horizontal opening 36 which is substantially complemental to door slot 29. A seal member 38 of rubber or similar material is secured between door skin 26 and housing 32 by fasteners 40 which extend through the seal, door skin and housing. Seal member 38 includes an elongated slit 42 which is aligned with door slot 29 and housing opening 36. A C-shaped bracket 44 is connected to housing 32 by fasteners 46 and encloses one end 48 of the housing. A helical spring 50 is located in housing 32 and abuts at one end against bracket 44. A rod part 52 is located in housing 32 and secured at one end to spring 50 by a pin 54 which extends through the rod part and the coils at the opposite end of the spring. Rod part 52 is bent or offset as shown and includes an elongated transverse slot 55 therethrough. A latch pin 56 which includes a pivot tab 58 is secured within rod part slot 55 at the tab by a fastener such as cotter pin 60. A pivot pin 62 extends through latch pin 56 and is located in housing slot 34. Latch pin 56 includes a frustoconical end part 64. Rod part 52 terminates in a threaded end portion 66 which is threaded into nut 68. A second rod part 70 is threaded into nut 68, as shown. The turning of nut 68 allows for the extension or retraction of rod part 70 and the resulting adjustment of latch mechanism 10 to accommodate doors fo varying widths. A stop 72 is fixed to vehicle side wall 12 as shown in FIGS. 1, 3, 4 and 5. Stop 72 includes a cup-like receptacle 74 in communication with an entry port 76 and a flexible lip retainer 78 which secures latch pin end part 64 in snap-fit interlock fashion. Stop 72 is a conventionally used part in the trade.

Latch mechanism 10 operates as follows. Door 14 is pivoted along hinge 24 from the closed position of FIGS. 1 and 3 in the direction of arrow 80 towards the open position of FIG. 5. The exposed end 71 of rod part 70 initially abuts against door jamb 22 and causes the compression of spring 50. As door 14 is opened (see FIG. 4), the spring 50 urges rod parts 52 and 70 towards jamb 22 and pivot tab 58 is cammed against the end of rod slot 55 to pivot latch pin 56 about its pivot pin 62 within housing slot 34 in the direction of arrow 82. When the door 14 is fully open (FIG. 5), spring 50 urges latch pin 56 into a fully extended position with latch pin 58 being aligned with receptacle 74 and pin end 64 being secured by a snap-fit within the receptacle by lip retainer 78.

Alternatively, latch mechanism 10, and most particularly housing 32 and rod parts 52 and 70 may be secured within vehicle side wall 12 as shown in FIGS. 6–9 with stop 72 secured to the outside of door 14. The operation is the same as described above with the exception that rod part 70 extends through jamb 22 and abuts door frame edge 27. As the door opens in the direction of arrow 84, spring 50 urges the rod parts 52 and 70 towards jamb 20 which causes latch pin 56 to swing outwardly in the direction of arrow 86 through seal member 38. When the door 14 is in the full open position of FIG. 9, latch pin 56 is extended fully and is secured in stop receptacle 74 by lip retainer 78.

As door 14 is closed, rod part 70 contacts either jamb 22 (FIGS. 1, 3, 4 and 5) or door frame edge 27 (FIGS. 6-9) and urges rod 52 into housing 32 to compress spring 50. Latch pin 56 pivots about its pivot pin 62 in housing slot 34 through seal member slit 42, door slot 29 (or wall slot 29') and housing opening 36 into its retracted, concealed position of FIGS. 1, 3, 6 and 7 within the outline of vehicle side wall 12.

It is understood that the invention is not limited to the precise details outlined above and may be modified within the scope of the appended claims.

I claim:

1. In combination a vehicle including a side wall having a door opening and an access door spanning said opening swingable between open and closed positions, and a latch means associated with said door and structure side wall for securing the door in its open position, said latch means comprising a latch pin swingably mounted to one of said door and structure sidewall between a retracted position within said one door and side wall and an extended position projecting outwardly of the one door and side wall, stop means located on the other of said door and side wall for accepting said latch pin in an interlock fashion when the latch pin is in its said extended position.

2. The combination of claim 1 wherein said latch means includes a housing mounted within said door, a rod shiftably positioned in said housing, said latch pin pivotally connected to said rod wherein shifting of the rod within said housing urges said latch pin between its said retracted and extended positions.

3. The combination of claim 2 wherein said rod has one end extending through said door and contracting a jamb of said structure side wall, and biasing means at the opposite end of said rod for urging said rod towards said jamb.

4. The combination of claim 3 wherein said rod includes an elongated transverse slot therein, said latch pin including a tab pivotally connected to said rod within said slot, said latch pin including means pivotally connecting the pin to said housing for pivotal movement relative to the housing into said extended and retracted positions as said rod shifts within the housing.

5. The combination of claim 2 wherein said rod includes first and second rod parts joined by an adjustment member whereby the length of said rod is adjustable to accommodate varying sizes of said door.

6. The combination of claim 1 wherein said latch means includes a housing mounted within said structure side wall adjacent to said door, a rod shiftably positioned within said housing, said latch pin pivotally connected to said rod wherein shifting of the rod within said housing urges said latch pin between its said retracted and extended positions.

7. The combination of claim 6 wherein said rod has one end extending through said structure side wall and abutting against said door, and biasing means at the opposite side end of said rod for urging said rod towards said door.

8. The combination of claim 7 wherein said rod includes an elongated transverse slot therein, said latch pin including a tab pivotally connected to said rod within said slot, said latch pin including means pivotally connecting the pin to said housing for pivotal movement relative to the housing into said extended and retracted positions as said rod shifts within the housing.

9. The combination of claim 8 wherein said rod includes first and second rod parts joined by an adjustment member whereby the length of said rod is adjustable to accommodate varying sizes of said door.

* * * * *